F. CLUTSAM.
KEYBOARD.
APPLICATION FILED JULY 19, 1907.

971,172.

Patented Sept. 27, 1910.

3 SHEETS—SHEET 1.

Witnesses
C. M. Boulter.
C. S. Rowley

Inventor
Frederick Clutsam
By Wm E Boulter,
Attorney

F. CLUTSAM.
KEYBOARD.
APPLICATION FILED JULY 19, 1907.
971,172.
Patented Sept. 27, 1910.
3 SHEETS—SHEET 2.
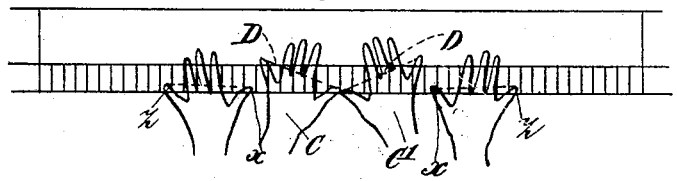
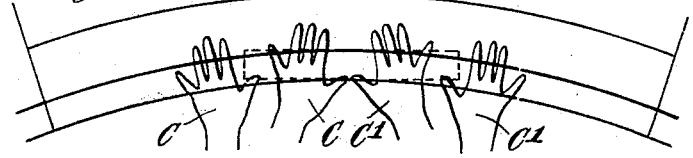
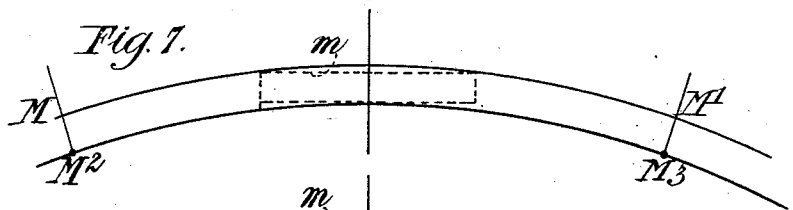
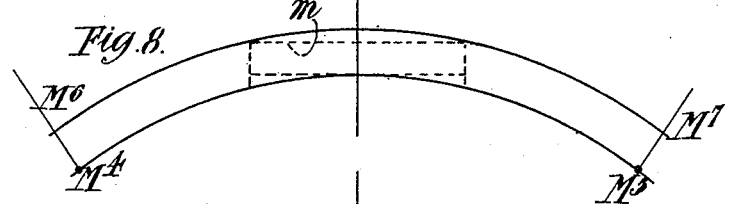
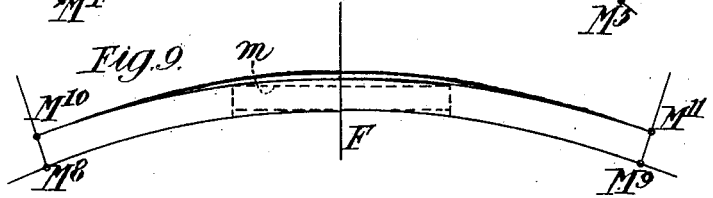
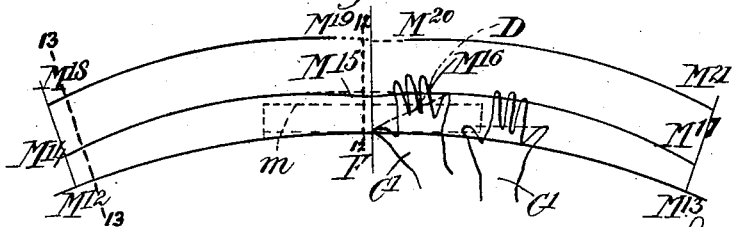

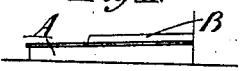
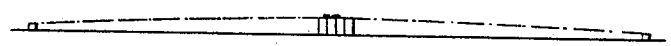
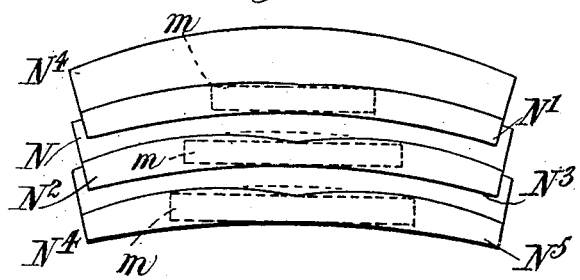
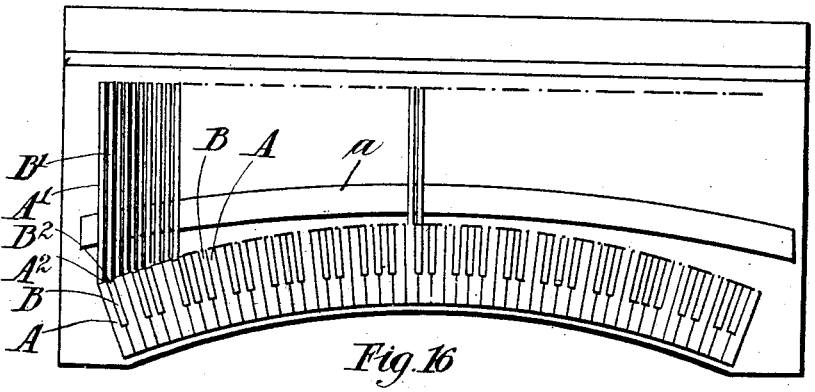

UNITED STATES PATENT OFFICE.

FREDERICK CLUTSAM, OF ST. KILDA, VICTORIA, AUSTRALIA.

KEYBOARD.

971,172.   Specification of Letters Patent.   Patented Sept. 27, 1910.

Application filed July 19, 1907. Serial No. 384,626.

*To all whom it may concern:*

Be it known that I, FREDERICK CLUTSAM, a subject of the King of England, residing at St. Kilda, State of Victoria, Australia, have invented certain new and useful Improvements in Keyboards, of which the following is a specification.

This invention relates to the keyboards of pianofortes, organs and the like musical instruments, its object being the construction of a keyboard wherein the keys or digitals lie more conveniently under the fingers of the performer than in previous constructions, thus reducing the lateral movement of the wrist and enabling the instrument to be played with increased facility and efficiency.

In a keyboard according to this invention the heads of the white digitals near the central portion of the keyboard are of more than the normal length to allow sufficient area of accommodation for the fingers, more especially when playing with crossed hands. This additional length of the white heads may extend throughout the whole keyboard, but does not necessarily do so, the increased accommodation being required principally in the middle two octaves or thereabouts. In addition to this increased length of the white heads, a keyboard according to this invention is preferably so formed that the front edges of its black and white digitals form curved contours, thus bringing the ends of the keyboard more within the range of the hands. Curved keyboards have been proposed previously, but they have not afforded the increased accommodation on the white digitals near the center of the keyboard. Moreover, a curved keyboard according to this invention is preferably made so that the curved contours formed by the edges of the black and white digitals correspond to curves calculated in the manner hereinafter described so as to bring the digitals into a very advantageous position beneath the performer's hands.

The invention will be best understood by reference to the accompanying drawings, in which—

Figure 1:
Figure 2:
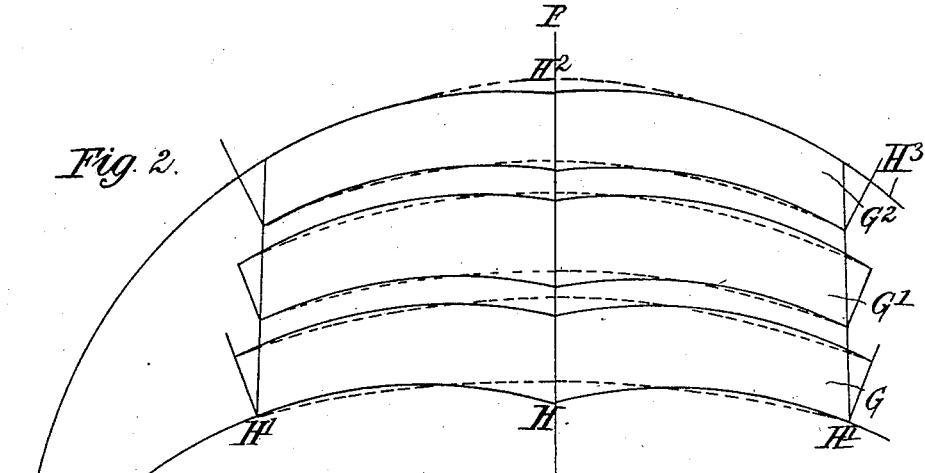
Figure 3:
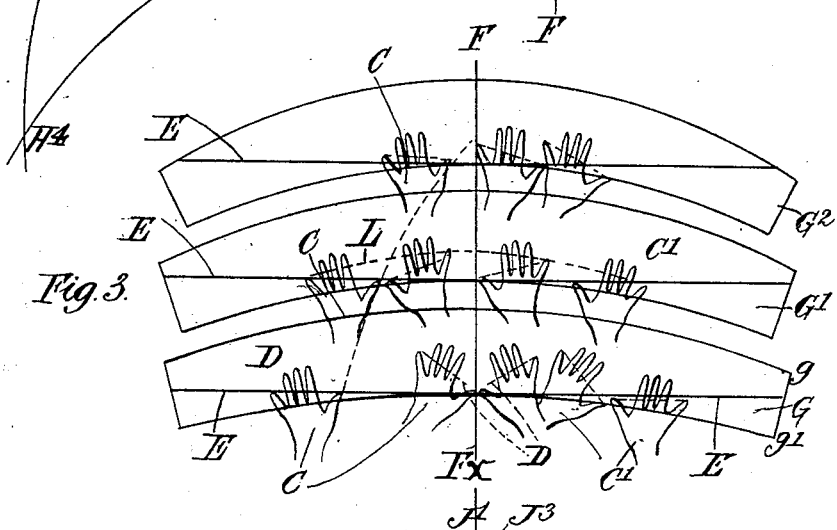
Figure 4:
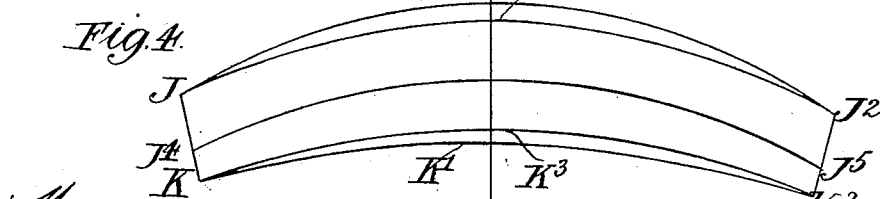

Figure 1 shows a straight keyboard having the heads of the white digitals near the central portion of more than normal length. Fig. 2 illustrates one stage in a preferred method of obtaining the curved contours in a keyboard according to this invention. Fig. 3 is a diagram similar to that forming Fig. 2 but with the hands shown in various natural positions to illustrate the need for the increased length of the white heads. Fig. 4 illustrates a curved keyboard having contours which are approximations to those illustrated in Fig. 3. Figs. 5 and 6 are diagrams illustrating the position of the hand near the center of a straight keyboard and an ordinarily curved keyboard and showing the want of accommodation in each case. Fig. 7 shows a curved keyboard having concentric contours but so arranged that the heads of the white digitals near the center of the board are of more than normal length. Fig. 8 is a diagram similar to Fig. 7 but showing an undue amount of curvature for a pianoforte keyboard. Fig. 9 illustrates a keyboard in which the contours are not concentric, the contour formed by the edges of the white digitals being a flatter curve than that formed by the front edges of the black digitals. Fig. 10 is a diagram showing another form of curved keyboard and illustrating the extra accommodation provided for the hands. Fig. 11 is a side elevation of a keyboard in which the digitals slope downward from back to front. Figs. 12 and 13 are enlarged sections on lines 12—12 and 13—13 respectively of Fig. 10. Fig. 14 illustrates diagrammatically another form of keyboard according to this invention which is arched or curved so that the upper surface of the digitals is slightly higher at the middle than at the ends. Fig. 15 shows an arrangement in plan of keyboards suitable for a three-manual organ, and Fig. 16 illustrates a method of connecting a curved keyboard according to this invention to a straight action.

With reference first to Fig. 1, A and B are respectively the white and black digitals of a keyboard, and it will be seen that while the front edges of the white digitals lie as usual in a straight line, the front edges of the raised or black notes lie on a curve so that the heads of the white digitals *i. e.* the portions of such digitals which extend in front of the black notes are longer near the central portion of the keyboard than they are nearer the ends. This is illustrated in Fig. 1 where it will be seen that the heads of the white digitals near the center of the board are considerably longer than they are at the ends. The long horizontal dotted line is drawn straight across so that it connects the front edges of the black notes at the ends of the key-board and it will be seen that there is an appreciable space between the front edges of the black notes near the center of the board and that line, this space representing the increased length of the white heads. The need for this increased accommodation on the heads of the white digitals will be more clearly understood with reference to the diagrams forming Figs. 2 and 3. The curve traced by the hand moving in a horizontal plane in a playing position will naturally vary according to the amount of extension of the arm, that is to say to the nearness of the body to the edge of the keyboard. Further, owing to the fact that the shoulders are separated by the width of the body, and to the general disposition of the muscles controlling the arms and the hands, the position of the hand upon the keyboard in any given position of the hand will vary according to the amount of extension of the arm, that is according to the distance of the hand from the body; for instance, in Fig. 3 a left hand C is shown with what may be termed its base line—that is the line D joining the top of the little finger and the thumb when the fingers are extended laterally—set square, that is parallel to a line E drawn normal to a line F passing through the center of the keyboard, and the performer's body. Three keyboards G, $G^1$ and $G^2$ are shown set at different distances from the performer, who is assumed to be sitting in front of them near the point X, and it will be seen that the position of the hand C in relation to the line F varies as the arm is extended. On the farther key-board $G^2$ the hand when resting normally, that is to say without twisting the wrist and when set square, i. e. when the "base line" is parallel to the line E, comes close in toward the line F, whereas in the nearest key-board G it is some distance away from that line when the "base line" is again parallel to the line E. As the arm sweeps around in its natural curve, the base line of the hand changes its position, as may be clearly seen by the positions of the right hands $C^1$ in the middle keyboard $G^1$ and the nearest keyboard G. In the case of the nearest keyboard G it will be seen that the base line D is displaced very much when the hand is brought in toward the central part of the board. Now, for facility in playing, lateral movement of the wrist should be, as far as possible, avoided, and in this invention the keyboard is constructed so that this is reduced to a minimum. Suppose now that the space between the lines $g$ $g^1$ of the keyboard G represents the length of a white digital, and that black digitals of the usual relative length are provided, obviously the hand could not be accommodated in its natural position when turned in toward the center of the board without fouling the black notes. As a matter of fact, such fouling would occur on the ordinary straight keyboard, as is more clearly illustrated in Fig. 5, where a straight keyboard with digitals of normal dimensions is shown, the hands C and $C^1$ being again in their normal position with the fingers laterally stretched. It will be observed that the space on the white heads fails to accommodate some part of the base line D in the case where the hands are near the center of the board. The little finger in each case would foul a black digital; hence, there would of necessity have to be either lateral movement of the wrist or very inconvenient bending of the fingers. Obviously, the fouling of the black notes could be avoided even in such a keyboard as G by making the white heads of increased length, but that might give rise to another disadvantage, namely that when the end of the thumb was upon the edge of a white digital, the front edges of the black digitals would be out of convenient reach of the fingers.

The nearest keyboard G may be taken as showing the disadvantage of a straight or comparatively straight contour when the performer is sitting in a position near to the front edge of the board. The line E would represent the straight edges of the white digitals, and it will be seen that the hands C and $C^1$ toward the left and right hand edges are about to pass out of reach of the edges of the digitals altogether. This disadvantage may be obviated merely by curving the board, which obviously brings the extreme notes of the keyboard nearer to the performer, and consequently more within the natural sweep of his arm, but a mere curvature without the provision of extra accommodation on the white heads near the center of the keyboard will introduce other disadvantages which outweigh the advantages secured; for example, as is illustrated in Fig. 6, where a keyboard with curved contours struck to concentric curves and having digitals of normal dimensions is shown, the raised black digitals are an obstruction to the lateral spread of the fingers, and inadequate space is afforded necessitating inconvenient bending of the fingers or excessive lateral wrist-movement.

Fig. 1 may be looked upon as a compromise in which, while retaining a straight keyboard, extra accommodation is provided for the hands in the central portion.

Referring now to Fig. 2, the line F, as in Fig. 3, represents a line drawn through the center of the keyboard and through the performer's body, and the arcs H $H^1$ represent the curves swept through by the right and left hands respectively with the hands back toward the body line, that is with the elbows much bent. The arcs $H^2$ $H^3$ are those swept through by the hands with the arms extended, the elbows being approximately straight, and these may be termed the arcs of "farthest extension." The two sets of arcs H H¹ H² H³ will intersect at points H⁴. The areas G² G¹ and G represent three keyboards taken as illustrating the two extreme positions and the mean position in the area inclosed by the arcs H H¹ H² H³ and are similar to the areas G G¹ G² of Fig. 3. It would be inconvenient in practice to make a keyboard of the precise curvature indicated, and so curves are struck similar to those shown by the broken lines, which approximate most closely to those formed by the various arcs. It is found in practice that the line approximating to the two arcs H² H³ is a curve having a radius of about 44″, while the curve which approximates nearest to the arcs H H¹ has a radius of about 90″. Fig. 4 shows two curves J J¹ J² and K K¹ K² having this relative curvature. Between these two curves should lie the contours of the keyboard and by way of example only one is shown which may be taken as generally typical. In this case assuming the board to be of normal length, i. e. seven octaves, and the length of the white digital at each end, that is the length J K or J² K² to be the usual 6″, the curves J J³ J² and K K³ K² give a length of about 7″ for the white digital at the center, while the curvature of the contour J⁴ J⁵ indicating the front edges of the black digitals shows in comparison with the curve K K³ K² the increase of length in the white heads toward the center. As a matter of fact, this example should be looked upon as an extreme one. Such a keyboard would only be suitable for long hands owing to the stretch between the edge of the white digital and that of the black digital. Other examples hereinafter given are more typical of the curved keyboard according to this invention.

Referring again to Fig. 3, it will be seen that in the keyboard G¹, which is at an intermediate distance from the performer— that is so that his arm is neither fully extended nor fully bent at the elbow but is in a normal playing position,—the hands, to be free of the black notes, require that the heads of the white notes shall have a length which varies according to the position of the board and is indicated by the dotted line L. In practice it is found that if the front edges of the white digitals have a contour corresponding, say, to a curve of 68″ radius, then a suitable curvature for the front of the black digitals would be one having a radius of about 52″. These curvatures correspond to a mean approximation to those formed by the performer's hands when his arms are extended in a playing position. A good working rule when setting out a curved keyboard is to so form the contour of the edges of the black and white digitals that the space occupied by the white heads, for, say, eighteen notes forming the central part of the keyboard shall be great enough to include the normal area of those same white heads in a straight keyboard. This can be attained with concentric curves; for instance, Fig. 7 shows two curves M M¹ and M² M³ which are concentric, the curve M² M³ being struck at a radius of 68″. The area inclosed by the dotted oblong m is that formed by the central eighteen notes on an ordinary straight keyboard, and it will be seen that this area lies within the space provided by the curves. Fig. 8 shows that a keyboard designed with concentric curves on this principle has limits to its curvature. The curve M⁴ M⁵ is struck with a radius of 36″, and it will be seen that to include, as before, the area m, it is necessary for the curve M⁶ M⁷, i. e. the contour of the front edges of the black digitals, to be at a greatly increased distance from the curve M⁴ M⁵. A construction such as this would result in a disproportionate length of the white heads and consequent difficulty in reaching the black digitals, and further, the curvature would tend to bring the ends of the keyboard too far around to and near the body line. In Fig. 9 the front curve M⁸ M⁹ is struck with a radius of 68″ as is the curve M² M³ in Fig. 7, and the outer curve M¹⁰ M¹¹, i. e. the contour of the front edges of the black digitals is not concentric, although its center lies on the same line F passing through the center of the keyboard and the performer's body. It will be seen that the curve M⁸ M⁹ is flatter than the curve M¹⁰ M¹¹.

The diagram forming Fig. 10 illustrates a form which is found in practice to give great facility in playing. The general principles underlying the curvature are the same as in the preceding examples but the curves forming the contours are not all parts of circles struck from the line F. The dimensions would be approximately as follows:— The curve M¹² M¹³ forming the contour of the front edges of the white digitals would be struck with a radius of 68″ from a center somewhere on the line F. The curve M¹⁴ M¹⁵ on the left hand side of the instrument forming the contour of the front edges of the black digitals would be struck with a radius of, say, 42½″ from a center displaced about 4″ to the left of the line F. The curve M¹⁶ M¹⁷ for the right hand side of the instrument is similarly struck from a center displaced about 4″ to the right of the line F. The curves M¹⁸ M¹⁹ and M²⁰ M²¹ are concentric with the curves M¹⁴ M¹⁵ and M¹⁶ M¹⁷ respectively. These two pairs of curves are joined, as indicated in dotted lines, at the center of the instrument. As in some of the earlier figures, the area m of the white heads at the central portion of an ordinary straight keyboard is shown included in the corresponding space in the curved board, and it will be seen that very much greater accommodation is provided. This is clearly shown by the hands $C^1$ which, as in Figs. 5 and 6, are in their natural position. It is to be noted that the base line D of the hands nearest to the center is wholly accommodated by the space provided for it on the white heads.

For the sake of clearness the contours herein described as approximations to the natural curves formed by the player's hands are parts of circles, but obviously in many cases it will be convenient to choose elliptical contours, and such are to be regarded as within the scope of this invention.

In setting out the digitals on the curved keyboard according to this invention obviously some amount of fanning is necessary, but too great a degree should be avoided especially in the central portion of the board.

The improved keyboard may be applied to an ordinary straight action and sounding board, and Fig. 16 illustrates diagrammatically and by way of example one such application. In this figure the digitals A and B are set to contours similar to those shown in Fig. 9, and in order to avoid as much as possible alteration of the other parts of the action, the levers $A^1$ and $B^1$ forming the extensions of the digitals are constructed with a lateral bend or curve as at $A^2$ and $B^2$. In such construction it is preferred to curve the balance rail $a$ so as to preserve the correct balance of the keys.

It is sometimes convenient in curved keyboards according to this invention to form the digitals so that they slope from back to front. Fig. 11 shows a black and a white digital in side elevation sloping in this way. The total fall from back to front of the white key would be about $\frac{1}{4}''$. When the digitals are sloped in this way from back to front, the slope need not extend right throughout the length of the keyboard, but may decrease as the end is approached until the end digitals are practically horizontal. For instance, Fig. 12 may be taken to be an enlarged section on the line 12—12 of Fig. 10 and to represent a digital near the center of the board and Fig. 13 to represent a section on the line 13—13 of Fig. 10 showing a digital near the end of the board.

In another form of keyboard also according to this invention the digitals as well as being curved as regards their front edges, are arched so that the digitals in the center are higher than those at the ends of the keyboard. Fig. 14 illustrates diagrammatically such a construction, but it will be understood that the amount of arching is exaggerated; in practice this would be represented by a difference in height of some $\frac{3}{8}''$ between the levels of the digitals at the middle and at the end of the keyboard in a pianoforte. The digitals of these arched keyboards may be sloped as described with reference to Fig. 11 or Figs. 12 and 13.

It will be obvious that in organs having two or more manuals necessarily at different distances from the performer, it will be of great advantage to make the contours formed by the edges of the black and white digitals approximate to the curve which would be traced by the hand when swung in the playing position extended for a distance equal to that between the particular keyboard and the performer. Fig. 15 illustrates such an arrangement for a three-manual organ. Suitable curves would be approximately as follows:—for the front contour $N\ N^1$ of the back keyboard, a radius of 52''; for the similar contour $N^2\ N^3$ of the middle keyboard a radius of 64'', and for the front contour $N^4\ N^5$ of the front keyboard a radius of 80''. The contours of the black notes are such as to give the greatest convenient accommodation for the hands on the white heads at the various distances, and as in the earlier examples, the areas inclosed in the broken lines $m$ indicate the space normally occupied by the white heads on an ordinary straight keyboard, and it will be seen that a considerable gain in the length of the white heads is obtained. In addition to curving the three keyboards in this manner, they may also be arched after the fashion of the keyboard illustrated in Fig. 14, and if this arching be employed its amount is preferably varied according to the height of the keyboard, the top manual being arched more than the middle one and the middle one more than the bottom keyboard, for the higher the position of the hands, the more do the curves formed naturally by them tend to dip as the hands move from the center to the extremity of the keyboard. The digitals may also be sloped in the manner described with reference to Fig. 11 or to Figs. 12 and 13, and the amount of the slope will be preferably greater in the digitals of the top keyboard than in those of the middle; the slope in the middle keyboard is in its turn greater than that in the lower manual.

What I claim as my invention and desire to secure by Letters Patent is—

1. A manual keyboard for a pianoforte, organ or like musical instrument having the heads of the white digitals near the central portion of the board longer than those near the ends of the board.

2. A manual keyboard for a pianoforte, organ or like musical instrument having the heads of the white digitals near the central portion of the board longer than those near the ends of the board, such digitals near the ends being of normal length.

3. A manual keyboard for a pianoforte, organ or like musical instrument so made that the ends of the black and white digitals lie on curved lines and having the heads of the white digitals near the central portion of the board of greater length than those near the ends of the board.

4. A manual curved keyboard for a pianoforte, organ or like musical instrument having the ends of the black and white digitals so disposed that at the central portion of the board the length of the heads of the white digitals is greater than the corresponding length in a normal straight keyboard, and greater than the corresponding length near the ends of the curved keyboard.

5. A manual keyboard for a pianoforte, organ or like musical instrument having the ends of the black and white digitals lying on curved lines the curve of the white digitals being flatter than that of the black ones.

6. A manual keyboard for a pianoforte, organ or like musical instrument having the ends of its digitals lying on curved lines the curve of the white digitals being flatter than that of the black ones the curves being such that they are a mean approximation to those formed by the performer's hands when his arms are extended into natural playing positions and his hands placed on the keyboard with the fingers naturally extended.

7. A manual keyboard for a pianoforte, organ or like musical instrument in which increased length of the heads of the white digitals near the central portion of the board is obtained by causing the ends of the black digitals to lie upon a curved line of less radius than that on which lie the ends of the white digitals.

8. A manual keyboard for a pianoforte, organ or like musical instrument having the ends of its digitals lying on curved lines the curve of the white digitals being flatter than that of the black ones, the surfaces of such digitals sloping downward from back to front.

9. A manual keyboard for a pianoforte, organ or like musical instrument having the ends of its digitals lying on curved lines the surfaces of such digitals sloping downward from back to front and the slope thereof decreasing toward the ends of the keyboard.

10. A manual keyboard for a pianoforte, organ or like musical instrument having the ends of its digitals lying on curved lines said digitals being also so disposed that the surfaces of those at the end of the keyboard are lower than those at the center.

11. In a pianoforte, organ, or like musical instrument a plurality of manual keyboards having the ends of their digitals lying in curved lines the curve of the white digitals being flatter than that of the black ones said lines varying in curvature according to the distance of the respective keyboards from the performer and being such that they are a mean approximation to those formed by the performer's hands when his arms are extended in a playing position to the particular keyboard.

12. In a manual keyboard for a pianoforte, organ or like musical instrument, a plurality of keyboards having the edges of their digitals lying on curved lines the curves on which the edges of the white and the black digitals lie in each board being such that at the central portion of the board the length of the heads of the white digitals is greater than the length of the heads nearer the ends of the board, said curves in each board being formed to approximate to the curves formed by the performer's hands when his arms are extended in a playing position to the particular keyboard.

In testimony whereof I have signed my name to this specification in the presence of two subscribing witnesses.

FREDERICK CLUTSAM.

Witnesses:
HARRY B. BRIDGES,
ARCHD. J. FRENCH.